(12) United States Patent
Arifuku

(10) Patent No.: US 12,476,930 B2
(45) Date of Patent: Nov. 18, 2025

(54) IMAGE PROCESSING APPARATUS AND SETTING METHOD OF ELECTRONIC MAIL

(71) Applicant: SHARP KABUSHIKI KAISHA, Sakai (JP)

(72) Inventor: Naoya Arifuku, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/600,999

(22) Filed: Mar. 11, 2024

(65) Prior Publication Data
US 2024/0323155 A1    Sep. 26, 2024

(30) Foreign Application Priority Data

Mar. 22, 2023 (JP) ................. 2023-045725

(51) Int. Cl.
| | | |
|---|---|---|
| *H04L 51/21* | (2022.01) | |
| *G06F 21/31* | (2013.01) | |
| *H04N 1/32* | (2006.01) | |
| *H04N 1/44* | (2006.01) | |

(52) U.S. Cl.
CPC .............. *H04L 51/21* (2022.05); *G06F 21/31* (2013.01); *H04N 1/32* (2013.01); *H04N 1/4413* (2013.01); *H04N 2201/3208* (2013.01)

(58) Field of Classification Search
CPC ......... H04L 51/21; H04L 51/42; G06F 21/31; H04N 1/32; H04N 1/4413; H04N 1/4433; H04N 1/00236; H04N 1/00238; H04N 1/00241; H04N 1/32005; H04N 1/32133; H04N 2201/0094; H04N 2201/3208
See application file for complete search history.

(56) References Cited

U.S. PATENT DOCUMENTS

| | | | |
|---|---|---|---|
| 9,794,258 B1 * | 10/2017 | Mears ................. | G06F 21/53 |
| 10,771,418 B2 * | 9/2020 | Sachtjen ............. | H04W 12/069 |
| 2005/0039019 A1 * | 2/2005 | Delany ................. | H04L 63/126 |
| | | | 713/176 |
| 2006/0192990 A1 | 8/2006 | Tonegawa | |
| 2009/0222887 A1 * | 9/2009 | Cohen .................. | H04L 9/3247 |
| | | | 709/206 |
| 2010/0171985 A1 * | 7/2010 | Tonegawa .......... | H04N 1/00209 |
| | | | 358/1.15 |

(Continued)

FOREIGN PATENT DOCUMENTS

| | | | | |
|---|---|---|---|---|
| JP | 2004-297767 A | 10/2004 | | |
| JP | 4656671 B2 * | 3/2011 | ......... | H04N 1/00209 |
| WO | WO-2008137938 A1 * | 11/2008 | ............ | H04L 51/12 |

*Primary Examiner* — Richard G Keehn
(74) *Attorney, Agent, or Firm* — ScienBiziP, P.C.

(57) ABSTRACT

An image processing apparatus comprising: one or more controllers that control transmission of electronic mail; a storage that stores user information of one or more users; and an authenticator that authenticates login of a user among the one or more users, wherein when priority setting of a transmission source address is enabled, the one or more controllers set the transmission source address, based on the user information of the user having logged in, and when the priority setting of the transmission source address is disabled, the one or more controllers set the transmission source address, based on transmitter information set for the apparatus.

6 Claims, 15 Drawing Sheets

(56) References Cited

U.S. PATENT DOCUMENTS

| | | | | |
|---|---|---|---|---|
| 2010/0287244 A1* | 11/2010 | Wicks | .................. | G06Q 10/107 |
| | | | | 709/206 |
| 2011/0004755 A1* | 1/2011 | Ueno | ..................... | G06F 21/31 |
| | | | | 713/168 |
| 2011/0067102 A1* | 3/2011 | Fukasawa | ............ | G06Q 10/107 |
| | | | | 709/206 |
| 2012/0317222 A1* | 12/2012 | Almeida | .............. | G06Q 10/107 |
| | | | | 709/206 |
| 2016/0316076 A1 | 10/2016 | Tonegawa | | |
| 2019/0187945 A1* | 6/2019 | Liu | ....................... | G06F 3/1222 |
| 2020/0265415 A1* | 8/2020 | Chattopadhyay | .... | G06Q 20/352 |
| 2020/0275225 A1* | 8/2020 | Proctor, Jr. | ......... | H04N 21/4622 |

* cited by examiner

FIG. 3

| USER ID, OR LOGIN ID | USER NAME, OR LOGIN USER NAME | PASSWORD, OR LOGIN PASSWORD | AUTHORITY | E-MAIL ADDRESS | REGISTRATION STATUS |
|---|---|---|---|---|---|
| 011 | user011 | ***** | MANAGER | user011@local | Yes |
| 022 | user022 | ***** | GENERAL | user022@local | Yes |
| 033 | user033 | ***** | GENERAL | — | No |
| ·· | ·· | ·· | ·· | ·· | ·· |

FIG. 4A

| PRIMARY SERVER | smtp@example.com |
| --- | --- |
| SECONDARY SERVER | — |
| PORT NUMBER | 587 |
| TIMEOUT, IN THE UNIT OF SECOND | 20 |
| TRANSMITTER NAME, OR SENDER | sendmfp@local |
| TRANSMISSION ADDRESS | sendmfp@local |
| SSL/TLS SETTING | Yes |

FIG. 4B

| ⋮ | ⋮ |
| --- | --- |
| USER INFORMATION IS SET IN From/Sender FIELD AS PRIORITY | Yes |
| ⋮ | ⋮ |

FIG. 12

| USER ID, OR LOGIN ID | USER NAME, OR LOGIN USER NAME | PASSWORD, OR LOGIN PASSWORD | AUTHORITY | E-MAIL ADDRESS | REGISTRATION STATUS | BELONGING GROUP | GROUP E-MAIL ADDRESS |
|---|---|---|---|---|---|---|---|
| 011 | user011 | ***** | MANAGER | user011@local | Yes | SALES GROUP | eigyou@local |
| 022 | user022 | ***** | GENERAL | user022@local | Yes | ACCOUNTING GROUP | keiri@local |
| 033 | user033 | ***** | GENERAL | — | No | GENERAL AFFAIRS GROUP | soumu@local |
| ⋮ | ⋮ | ⋮ | ⋮ | ⋮ | ⋮ | ⋮ | ⋮ |

IMAGE PROCESSING APPARATUS AND SETTING METHOD OF ELECTRONIC MAIL

CROSS-REFERENCE TO RELATED APPLICATION

The present application claims priority from Japanese Application JP2023-045725, the content to which is hereby incorporated by reference into this application.

BACKGROUND OF THE INVENTION

1. Field of the Invention

The present disclosure relates to an image processing apparatus, and the like.

2. Description of the Related Art

A "From" field and a "Sender" field disposed in an e-mail header in electronic mail (e-mail) (hereinafter occasionally referred to as "From/Sender field") are a display area in which a name of a sender of the e-mail (including his or her e-mail address if it is included), an e-mail address of a transmitter, and the like. By confirming content displayed in the From/Sender field, a recipient of the e-mail can understand the sender and the transmission source address of the e-mail.

For example, it is known that, at transmission of e-mail, an e-mail address of a logged-in user who has logged in to an image forming apparatus is set to the From/Sender field.

SUMMARY OF THE INVENTION

An objective of the present disclosure is to provide an image processing apparatus, and the like, capable of flexible operation regarding setting of the From/Sender field of e-mail, particularly in terms of display in the From/Sender field.

So as to solve the above-stated problem, an image processing apparatus according to the present disclosure includes: a controller that controls transmission of electronic mail; a storage that stores user information of one or more users; and an authenticator that authenticates login of a user among the one or more users, in which when priority setting of a transmission source address is enabled, the controller sets the transmission source address, based on the user information of the user having logged in, and when the priority setting of the transmission source address is disabled, the controller sets the transmission source address, based on transmitter information set for the apparatus.

A setting method of electronic mail according to the present disclosure includes storing user information of one or more users; authenticating login of a user among the one or more users; when priority setting of a transmission source address is enabled, setting the transmission source address, based on the user information of the user having logged in; and when the priority setting of the transmission source address is disabled, setting the transmission source address, based on transmitter information set for an apparatus.

The present disclosure can provide an image processing apparatus, and the like, capable of flexible operation regarding setting of the From/Sender field of e-mail, particularly in terms of display in the From/Sender field.

BRIEF DESCRIPTION OF THE DRAWINGS

FIG. 3 is for explaining a user information table according to the first embodiment.

FIG. 4A is for explaining an SMTP setting information table, and FIG. 4B is for explaining a setting status of priority setting.

FIG. 12 is for explaining a user information table according to the second embodiment.

DETAILED DESCRIPTION OF THE INVENTION

Hereinafter, some embodiments of the present disclosure are described with reference to the accompanying drawings. Note that the following embodiments are some examples for explaining the present disclosure, and the technical scope recited in the scope of claims is not limited by the following description.

So as to transmit e-mail, an apparatus has to be set in accordance with the Simple Mail Transfer Protocol (SMTP), which is an e-mail transmission protocol with respect to the e-mail service provider. In the SMTP setting, as described later, various setting is performed, including setting of transmitter information related to a transmission source of e-mail, such as a name of a sender and an e-mail address of the transmitter, in addition to the e-mail service provider and connection information such as port number.

When e-mail is transmitted, the name of the sender which has been set as transmitter information is reflected and displayed in the From field, and the transmission source address is reflected and displayed in the Sender field.

For example, when e-mail is transmitted via an image processing apparatus for personal use, which is installed in a home or the like, the transmitter information displayed in the From/Sender field is the same as the transmitter information of the actual transmitter of the e-mail, which rarely pose a problem.

On the other hand, for example, in image processing apparatuses installed in offices or public places and thus having a high likelihood of being shared, it is rare that a name of an individual user or his or her e-mail address, etc. is set as transmitter information. In many cases, the transmitter information is set based on a common name, a designation, or a general term on the basis of a unit type, a model number, a function, an installation environment, or the like, of the image processing apparatus. In such cases, it is difficult to identify the actual transmitter of the e-mail, from the content displayed in the From/Sender field of the transmitted e-mail, which may confuse the recipient of the e-mail. On the other hand, there have been requests that a common name, or the like, of the image processing apparatus should be the transmission source, so as to avoid identification of the actual transmitter. In this way, flexible operation of the setting of the From/Sender field has been desired.

The present disclosure realizes an image processing apparatus, and the like, capable of flexible operation regarding setting of the From/Sender field of e-mail, particularly in terms of display in the From/Sender field, in the following embodiments.

1. First Embodiment

The first embodiment describes, as an embodiment of the image processing apparatus, a compound machine capable of performing, in a single case, a job executed in respective modes such as printing, copying, scanning, facsimile transmission, and transmission of e-mail attached with image data.

Figure 1:
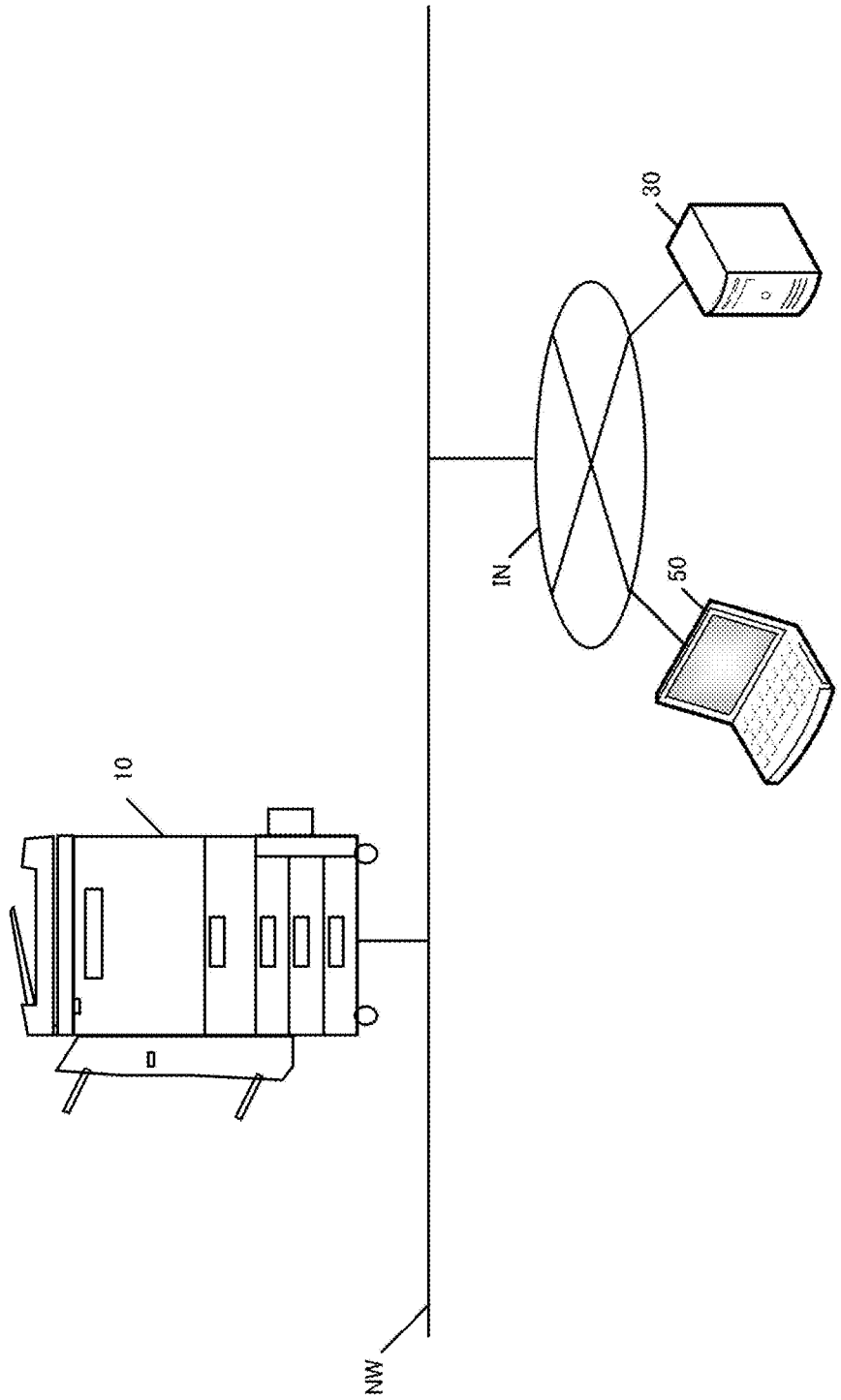
FIG. 1 is a general view for explaining a connection configuration of a compound machine according to a first embodiment.

FIG. 1 is a diagram schematically illustrating an example of a connection configuration among a compound machine 10, an e-mail server 30, and a terminal apparatus 50 being a transmission destination of e-mail from the compound machine 10. The compound machine 10 is connected to a network NW such as a local area network (LAN), a wide area network (WAN), the Internet, a telephone line, and a facsimile line. The network NW is further connected to the Internet network IN, and the compound machine 10 is connected to be communicable with the e-mail server 30 or the like, via the network NW and the Internet network IN. Then, the terminal apparatus 50 can receive e-mail transmitted from the compound machine 10 via the e-mail server 30. Note that a plurality of compound machines 10 may be connected to the network NW.

1.1. Function Configuration
1.1.1. Compound Machine 10

Figure 2:
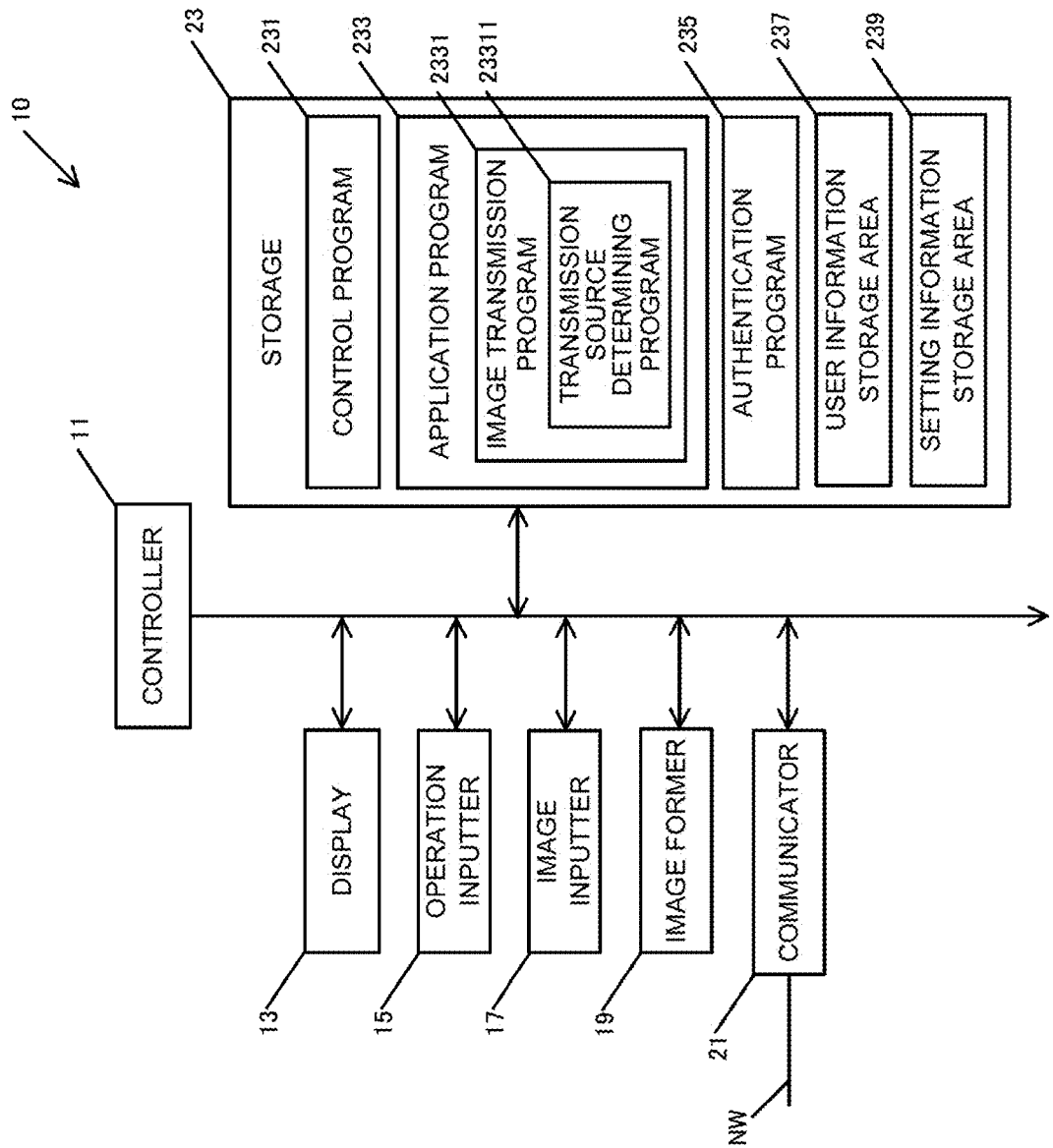
FIG. 2 is a function configuration diagram of the compound machine according to the first embodiment.

A function configuration of the compound machine 10 according to the first embodiment is described with reference to FIG. 2. FIG. 2 is a function configuration diagram of the compound machine 10. The compound machine 10 includes one or more controllers 11, a display 13, an operation inputter 15, an image inputter 17, an image former 19, a communicator 21, and a storage 23.

The one or more controllers 11 control the entire compound machine 10. The one or more controllers 11 are configured by, for example, one or more arithmetic units (central processing unit (CPU) or the like). The one or more controllers 11 read various types of programs stored in the storage 23, and control respective devices such as the image inputter 17, the image former 19, and the communicator 21, thereby to realize a job and an apparatus function in each mode.

The display 13 displays various types of information to a user, or the like. The display 13 can be configured by a display apparatus such as a liquid crystal display (LCD) and an organic electro-luminescence (EL) display. The display 13 displays each application screen, system setting screen, user authentication screen, or the like, based on control by the one or more controllers 11.

The operation inputter 15 accepts an input of information by a user, or the like. The operation inputter 15 can be configured by an inputting apparatus such as a hard key (e.g., ten key) and a button. Note that the operation inputter 15 may also be configured as a touch panel to which inputting via the display 13 is possible. In this case, such general methods may be adopted as a resistive film type, an infrared ray type, an electromagnetic induction type, and a capacitive sensing type, as a method to input to the touch panel.

The image inputter 17 may be configured as a scanner apparatus equipped with an image sensor such as a charge coupled device (CCD) and a contact image sensor (CIS), an automatic document feeder (ADF), and a flatbed for mounting thereon a document. In this case, the scanner apparatus is not particularly limited as long as it has such a configuration to be capable of generating image data by reading an image of light reflected from a document image by the image sensor. Note that the image inputter 17 can also be configured as an interface that can obtain image data stored in an external storage (device) such as a universal serial bus (USB), image data received via the network NW, or the like.

The image former 19 forms an image based on the image data input from the image inputter 17, on paper, or the like, as a recording medium. The image former 19 feeds paper from a paper feeder not illustrated in the drawings, forms an image on the paper based on the image data, and thereafter discharges the paper to a paper discharger not illustrated in the drawings. The image former 19 can be configured by an electrophotographic laser printer or the like. In this case, the image former 19 forms an image using toner(s) supplied from toner cartridge(s), not illustrated in the drawings, corresponding to toner color(s) (e.g., cyan, magenta, yellow, and black).

The communicator 21 has an interface enabling either wired or wireless communication or both wired and wireless communication, for communicating with external devices (e-mail server 30, or the like) via the network NW such as a LAN, a WAN, the Internet, a telephone line, and a facsimile line.

The storage 23 stores various types of programs required for operation of the compound machine 10 and various types of data. The storage 23 can be configured by a storage device such as a random access memory (RAM), a hard disk drive (HDD), a solid state drive (SSD), and a read only memory (ROM), for example.

In the first embodiment, the storage 23 stores a control program 231, an application program 233, and an authentication program 235, and allocates therein a user information storage area 237 and a setting information storage area 239.

The control program 231 is a program read by the one or more controllers 11 in general control of the compound machine 10. The one or more controllers 11, having read the control program 231, control driving of each device, such as the display 13, the operation inputter 15, the image inputter 17, the image former 19, the communicator 21, or the like.

The application program 233 is a program read by the one or more controllers 11 in performing, in the unit of a job, processing related to respective modes such as printing, copying, scanning, facsimile transmission, and transmission of e-mail attached with image data. The application program 233 may include an image transmission program 2331, for example. The one or more controllers 11 can transmit image data input via the image inputter 17, as an attachment to e-mail, by reading the image transmission program 2331. The image transmission program 2331 as described above includes a transmission source determining program 23311. The one or more controllers 11, having read the transmission source determining program 23311, determine whether to set user information of a logged-in user to the transmission source address, or to set the transmitter information set for the apparatus, to the transmission source address, based on priority setting of the transmission source address, which will be described later.

The authentication program 235 is a program read by the one or more controllers 11 in authenticating a user attempting to log in to the compound machine 10. The one or more controllers 11, having read the authentication program 235, function as an authenticator; and when a user authentication function is enabled, cause a later-described login screen to be displayed on the display 13, and accept authentication information related to user authentication. For example, when the authentication condition is a combination of a logged-in user name and a login password, the one or more controllers 11 store, in advance, logged-in user names and login passwords related to user authentication, and can perform user authentication by verifying a logged-in user name and a login password which have been input via the login screen. In the present disclosure, a user having succeeded in user authentication and gained an operation authority for the compound machine 10 is referred to the "logged-in user". Here, in addition to by knowledge-based authentication combining a logged-in user name and a login password, the user authentication can be performed by property-based authentication using a token, a key, an integrated circuit (IC) card, a smartphone, or the like, biometric authentication such as face authentication, fingerprint authentication, or the like. Note that the one or more controllers 11 can accept setting of enabling/disabling of the user authentication function via a system setting screen, not illustrated in the drawings, or the like.

The user information storage area 237 is a storage area for storing therein user information of logged-in users. The setting content included in user information can be accepted via a later-described user information setting screen. Here, exemplary user information stored in the user information storage area 237 is described with reference to FIG. 3. FIG. 3 is for explaining an exemplary configuration of a data structure of a user information table. The user information table includes, as items to be managed, a user ID (login ID), a user name (logged-in user name), a password (login password), authority, an e-mail address, and a registration status.

The user ID (login ID) is an identifier to uniquely identify a logged-in user. The user name (logged-in user name) represents a name of a logged-in user, and the password (login password) represents a password used by a user to log in to the compound machine 10. The authority represents an operation authority assigned to the logged-in user. When the authority is "manager", for example, the logged-in user is assigned a management authority to manage the compound machine 10. On the other hand, when the authority is "general", the logged-in user is assigned an operation authority with which only operation of the compound machine 10 is possible. The e-mail address represents an e-mail address of the logged-in user. The registration status is a flag representing the registration status indicating whether the e-mail address of the logged-in user is registered to the compound machine 10 or not.

For example, a logged-in user whose user ID (login ID) is "011" has a user name (logged-in user name) of "user011", and a password (login password) to log in to the compound machine 10 of "***". It can also be known, from the user information table, that the logged-in user has his or her e-mail address "user011@local" registered in the compound machine 10** (registration status "Yes").

The user name and the e-mail address of the logged-in user registered (stored) in the user information table are reflected and displayed in a From/Sender field of an e-mail header of e-mail, when priority setting of the transmission source address, which will be described later, is enabled (Yes).

The setting information storage area 239 is a storage area for storing therein setting information set to an apparatus. Here, exemplary setting information stored in the setting information storage area 239 is described with reference to FIG. 4A and FIG. 4B. FIG. 4A is for explaining an exemplary configuration of a data structure of an SMTP setting information table. Setting content included in SMTP setting information can be accepted via a later-described SMTP setting screen. The SMTP setting information table includes, items to be managed, a primary server, a secondary server, a port number, timeout (second), transmitter information which is a transmitter name (sender) and a transmitter address, and SSL/TLS setting.

The primary server represents e-mail service provider (e-mail server 30) to be preferentially used, and the secondary server represents an e-mail service provider to be alternatively used. The port number represents a number to identify a program which the one or more controllers 11 use in TCP/IP communication. The timeout (second) represents a time limit at which processing is stopped in cases where the communication, session, or the like is not established. The transmitter name (sender) and the transmitter address are transmitter information set for the apparatus, and are reflected and displayed in the From/Sender field of the e-mail header of e-mail when the priority setting of the transmission source address, which will be described later, is disabled (No). The SSL/TLS setting represents whether to enable (Yes) or disable (No) the cryptographic protocols for encrypting content of communication on the Internet.

For example, FIG. 4A illustrates an example in which smtp@example.com is set as a primary server of the e-mail service provider, "587" as the port number, "20" as the timeout (second), "sendmfp@local" as the transmitter name (sender), "sendmfp@local" as the transmitter address, and "Yes" as SSL/TLS setting.

FIG. 4B is for explaining a setting status of priority setting to determine whether to set, as the transmission source address, the user information of the logged-in user or the transmitter information set for the apparatus. FIG. 4B is an example in which "Yes" is set as the parameter in "USER INFORMATION IS SET IN FROM/SENDER FIELD AS PRIORITY".

In this case, the one or more controllers 11, having read the transmission source determining program 23311, set, as the transmission source address, the user information of the logged-in user, based on the setting status of the priority setting.

1.1.2. E-mail Server 30

An e-mail server 30 according to the present embodiment can have a known configuration as long as it can provides functions as an SMTP server, a POP(Post office protocol) server, or an IMAP (Internet message access protocol) server, and can mediate transmission and reception of e-mail between the compound machine 10 and the terminal apparatus 50, etc. Therefore, explanation of the function configuration of the e-mail server 30 is omitted.

1.1.3. Terminal Apparatus 50

The terminal apparatus 50 is a terminal apparatus having a configuration capable of performing transmission and reception of e-mail with the compound machine 10 via the e-mail server 30. The terminal apparatus 50 is not particularly limited, but may be a mobile terminal apparatus such as a smartphone, a tablet, a portable telephone, and a notebook computer, and a stationary terminal apparatus such as a desktop computer.

1.2. Flow of Processes

Figure 5:
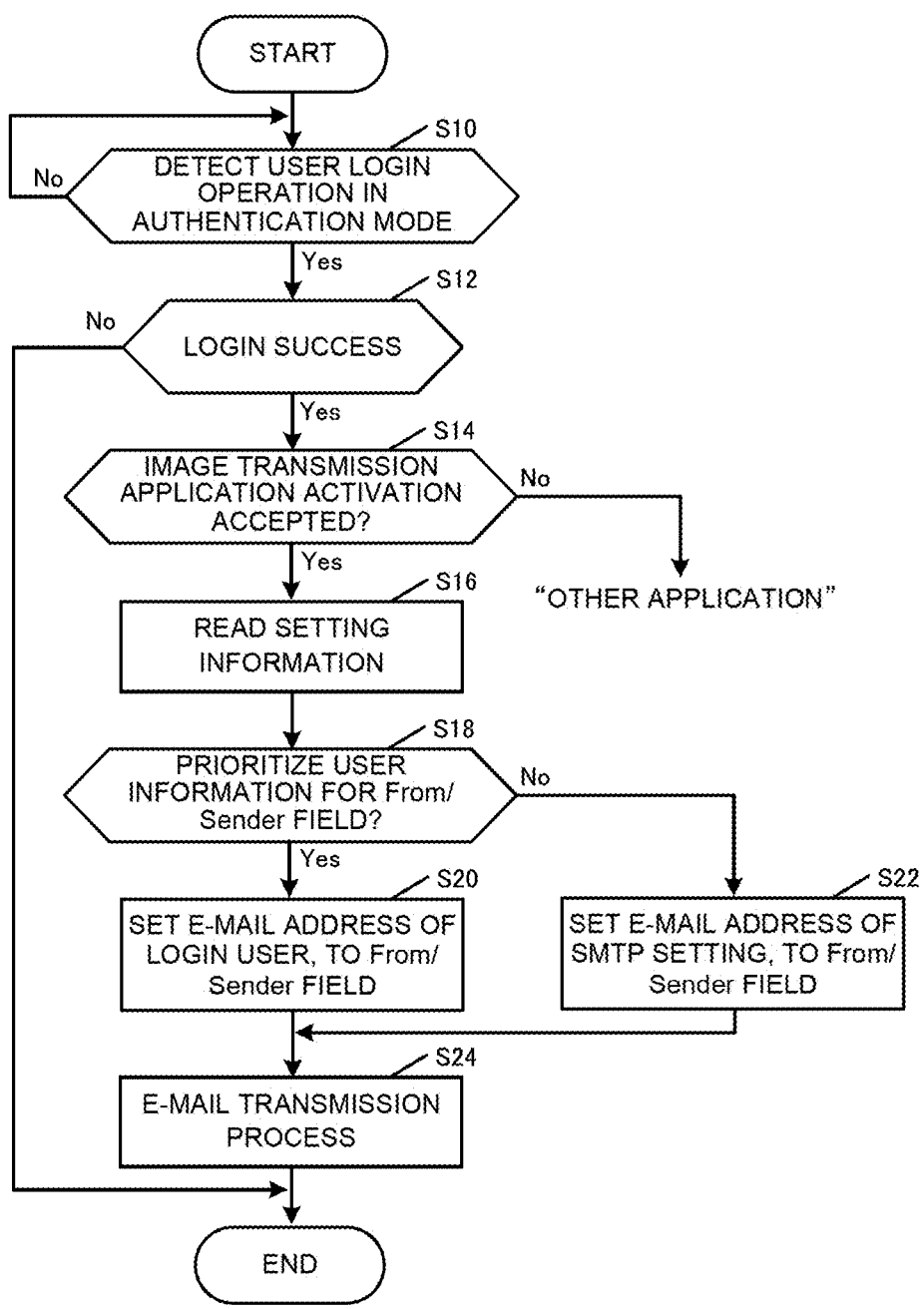
FIG. 5 is a flowchart for explaining a flow of processes of the first embodiment.

The following describes a flow of processes according to the first embodiment. FIG. 5 is a flowchart for explaining a flow of processes to set the From/Sender field of e-mail in the compound machine 10. The processes explained in FIG. 5 are processes executed by the one or more controllers 11 by reading the control program 231, the image transmission program 2331 (transmission source determining program 23311), the authentication program 235, and the like.

First, the one or more controllers 11 determine whether a login operation by a user is detected in an authentication mode (step S10). In this case, the one or more controllers 11 can detect a login operation by a user by accepting an input of a logged-in user name and a login password by a user, via the later-described login screen.

When having detected a login operation by a user in the authentication mode, the one or more controllers 11 perform a login authentication process, and determine whether the login by the user succeeded (step S10; Yes→step S12). Note that, when not having detected any login operation by a user in the authentication mode, the one or more controllers 11 wait till the login operation is detected (step S10; No). Then, when having determined that the login by the user succeeded, the one or more controllers 11 determine whether an input of an instruction to activate an image transmission application has been accepted from the logged-in user (step S12; Yes→step S14). On the other hand, when the login by the user failed, the one or more controllers 11 end the processes (step S12; No→End). Note that in this case, the one or more controllers 11 may, instead of immediately ending the processes, re-display the login screen on the display 13, to prompt the user to perform the login operation again. Such an embodiment is also possible in which the one or more controllers 11 end the processes when erroneous authentication information is accepted a plurality of times.

When having determined that an input of an instruction to activate the image transmission application has been accepted from the logged-in user, the one or more controllers 11 read setting information set for the apparatus (step S14; Yes→step S16).

Note that, when having determined that an input of an instruction to activate the image transmission application has not been accepted from the logged-in user, the one or more controllers 11 determine that the logged-in user has selected any other application, and thereby activate the other application selected by the logged-in user (step S14; No→"other application").

In step S16, the one or more controllers 11 read the setting status of the priority setting of the transmission source address illustrated in FIG. 4B, and determine whether the transmission source address to be displayed on the From/Sender field of the e-mail should be the user information of the logged-in user or the transmitter information set for the apparatus (step S18).

When having determined that the priority setting of the user information is made with respect to the From/Sender field, the one or more controllers 11 set the e-mail address of logged-in user in the From/Sender field as the transmission source address (step S18; Yes→step S20). Specifically, as illustrated in FIG. 4B, when "Yes" is set as the parameter in "USER INFORMATION IS SET IN FROM/SENDER FIELD AS PRIORITY", the one or more controllers 11 set the e-mail address of the logged-in user in the From/Sender field as the transmission source address.

On the other hand, when having determined that the priority setting of the user information is not made with respect to the From/Sender field (i.e., when having determined to set the transmitter information set for the apparatus as the transmission source address), the one or more controllers 11 set an e-mail address based on the SMTP setting, to the From/Sender field as the transmission source address (step S18; No→step S22). Specifically, when "No" is set as the parameter in "USER INFORMATION IS SET IN FROM/SENDER FIELD AS PRIORITY", the one or more controllers 11 set the e-mail address based on the SMTP setting, to the From/Sender field as the transmission source address. Note that such an embodiment is also possible in which, when having determined that the priority setting of the user information is not made with respect to the From/Sender field, the one or more controllers 11 display a selection screen, not illustrated in the drawings, to accept selection as to whether the transmission source address to be displayed on the From/Sender field of the e-mail should be the user information of the logged-in user or the transmitter information set for the apparatus, and determine the transmission source address to be displayed on the From/Sender field depending on the selection.

Then, the one or more controllers 11 transmit the created e-mail to the destination, and end the processes (step S24).

1.3. Operation Example

Figure 6:
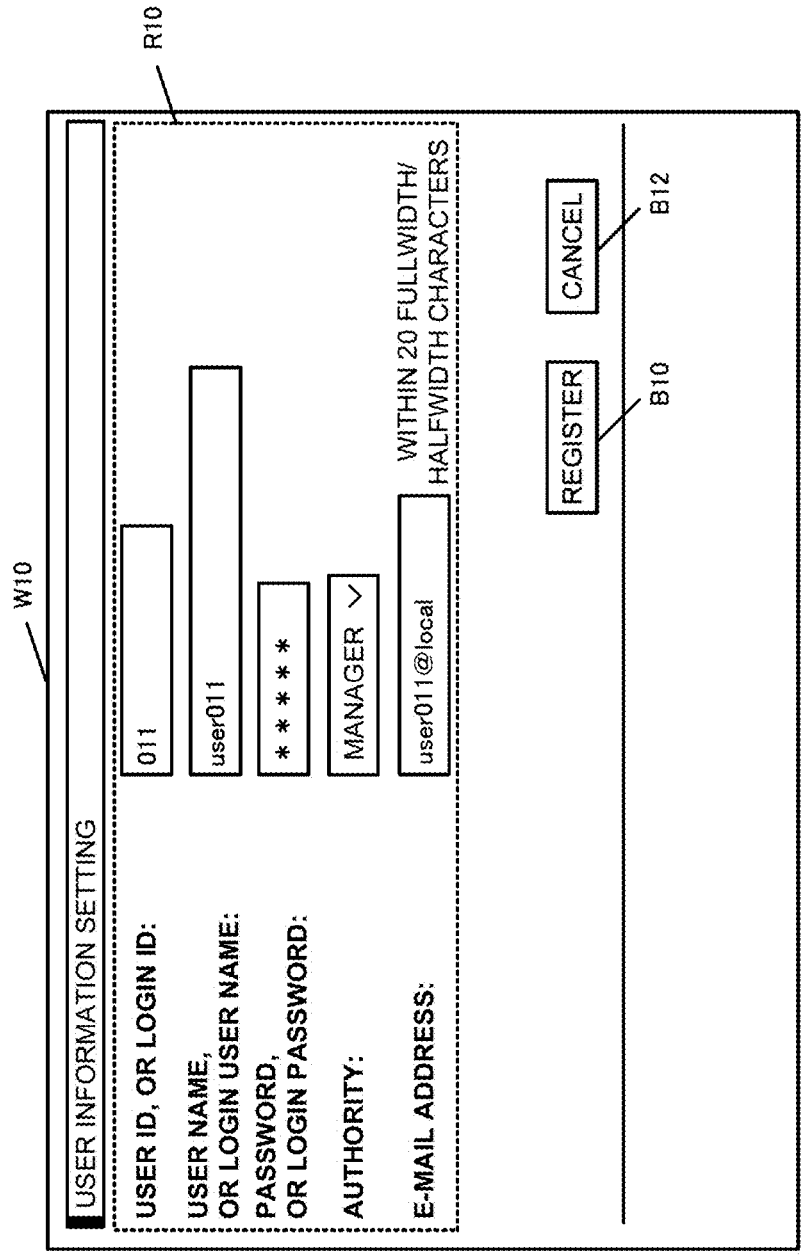
FIG. 6 is a diagram for explaining an operation example of the first embodiment.

The following describes an operation example according to the first embodiment. FIG. 6 is a diagram for explaining one configuration example of a user information setting screen W10. FIG. 6 explains an exemplary configuration of the user information setting screen W10.

The user information setting screen W10 includes a user information inputting area R10, a registration button B10, and a cancellation button B12.

The user information inputting area R10 includes, as an input box to accept an input of user information, a user ID (login ID) input box, a user name (logged-in user name) input box, a password (login password) input box, an authority input box, and an e-mail address input box.

FIG. 6 represents an exemplary input of the user information of the logged-in user identified by the user ID (login ID) "011" illustrated in the user information table of FIG. 3. For example, as illustrated in FIG. 6, the manager of the user information can input "011" in the user ID (login ID) input box, "user011" in the user name (logged-in user name) input box, "*****" in the password (login password) input box, "manager" in the authority input box, and "user011@local" in the e-mail address input box, respectively.

The registration button B10 is a button to accept an instruction to confirm the input of the user information with respect to the user information inputting area R10. After completing input to the user information inputting area R10, the manager of the compound machine 10 can confirm the user information having been input, by selecting the registration button B10. When having accepted the selection of the registration button B10, the one or more controllers 11 register, as the user information, the content input to the user information inputting area R10. On the other hand, the cancellation button B12 is a button to accept an instruction to discard (cancel) input of the user information with respect to the user information inputting area R10. When having accepted the selection of the cancellation button B12, the one or more controllers 11 discard the content input to the user information inputting area R10, and end the processes related to the user information setting.

Figure 7:
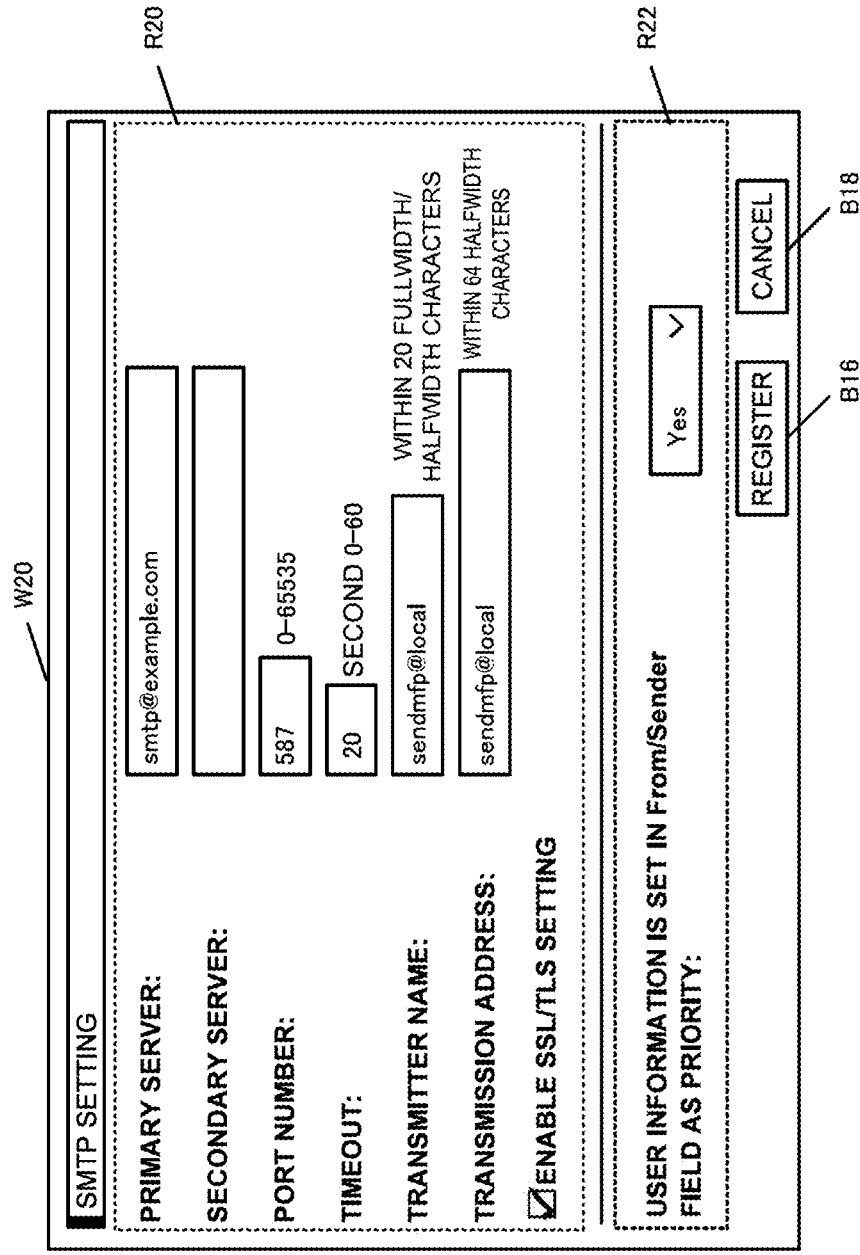
FIG. 7 is a diagram for explaining an operation example of the first embodiment.

FIG. 7 is a diagram for explaining an exemplary configuration of the SMTP setting screen W20.

The SMTP setting screen W20 includes an SMTP setting input area R20, a transmission source address priority setting area R22, a registration button B16, and a cancellation button B18.

The SMTP setting input area R20 includes, as an input box to accept input of SMTP setting, a primary server input box, a secondary server input box, a port number input box, a timeout input box, a transmitter name input box, a transmitter address input box, and a check box to enable SSL/TLS.

FIG. 7 represents an exemplary input of SMTP setting as illustrated in the SMTP setting information table of FIG. 4A. For example, as illustrated in FIG. 7, the manager can input "smtp@example.com" in the primary server input box, no input to the secondary server input box (meaning that there is no corresponding server, "587" in the port number input box, "20" in the timeout input box, "sendmfp@local" in the transmitter name input box, "sendmfp@local" in the transmitter address input box, respectively. In addition, the manager can perform SSL/TLS enable/disable setting by selecting to make a check to the check box to enable SSL/TLS. The state in which a check is made to the check box to enable SSL/TLS in FIG. 7 indicates that SSL/TLS is set to be enabled.

The transmission source address priority setting area R22 accepts priority setting selection as to whether the transmission source address to be displayed on the From/Sender field of the e-mail should be the user information of the logged-in user or the transmitter information set for the apparatus. In the transmission source address priority setting area R22, by selecting either "Yes" or "No" as the parameter of "USER INFORMATION IS SET IN FROM/SENDER FIELD AS PRIORITY", the manager can set the transmission source address to either the user information of the logged-in user or the transmitter information set for the apparatus.

The registration button B16 is a button to accept an instruction to confirm an input with respect to the SMTP setting input area R20 and the transmission source address priority setting area R22. After completing input to the SMTP setting input area R20 and the transmission source address priority setting area R22, the manager of the compound machine 10 can confirm the setting information having been input, by selecting the registration button B16. When having accepted the selection of the registration button B16, the one or more controllers 11 register, as the SMTP setting and the transmission source address priority setting, the content input to the SMTP setting input area R20 and the transmission source address priority setting area R22. On the other hand, the cancellation button B18 is a button to accept an instruction to discard (cancel) input of the setting information with respect to the SMTP setting input area R20 and the transmission source address priority setting area R22. When having accepted the selection of the cancellation button B18, the one or more controllers 11 discard the content input to the SMTP setting input area R20 and the transmission source address priority setting area R22, and end the processes related to the SMTP setting.

Figure 8:
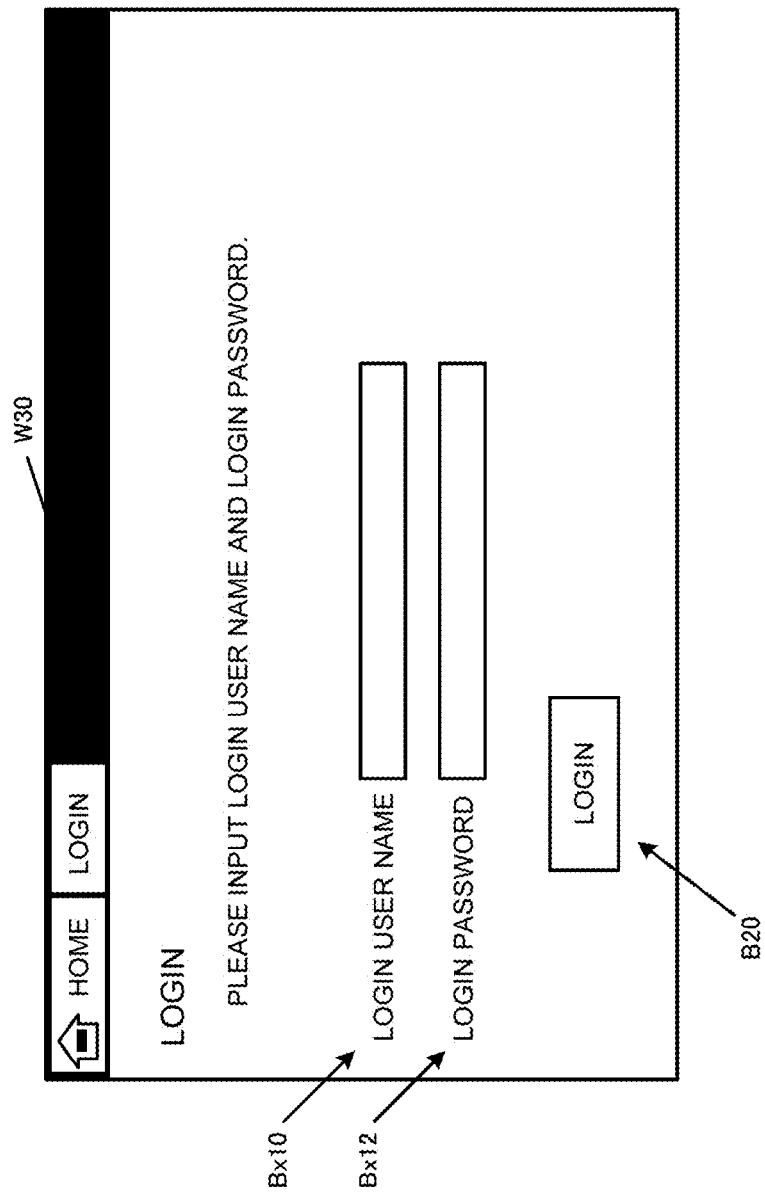
FIG. 8 is a diagram for explaining an operation example of the first embodiment.

FIG. 8 is a diagram for explaining an exemplary configuration of the login screen W30 which the one or more controllers 11 display on the display 13, when the user authentication function is enabled.

The login screen W30 includes a logged-in user name input box Bx10, a login password input box Bx12, and a login button B20.

The logged-in user name input box Bx10 accepts an input of a logged-in user name of a user attempting to log in to the compound machine 10. Note that the logged-in user name may be either directly input by using an input apparatus such as a keyboard, or input by selecting from a user name list displayed in a separately-provided list which is not illustrated in the drawings.

The login password input box Bx12 is an input box to accept an input of a login password that corresponds to the logged-in user name. The user attempting to log in to the compound machine 10 inputs the login password along with the logged-in user name.

The login button B20 is a button to accept an instruction to confirm an input operation by a user. After completing input to the logged-in user name input box Bx10 and the login password input box Bx12, the user selects the login button B20. Upon reception of an instruction to select the login button B20, the one or more controllers 11 perform a process to authenticate the logged-in user. Note that the user authenticating body may be the apparatus itself, or may be designated to be a login authentication server, etc. separately provided on the network (NW). When the apparatus itself is designated to be the user authenticating body, the one or more controllers 11 perform user authentication by comparing the logged-in user name and the login password, having been input, with the authentication information (e.g., a combination of a user name and a password) having been prepared in advance. On the other hand, when the login authentication server provided on the network (NW), which is not illustrated in the drawings, is designated as the user authenticating body, the one or more controllers 11 perform user authentication, by transmitting, to the login authentication server, the logged-in user name and the login password, having been inputted, and receiving an authentication result from the login authentication server.

Figure 9:
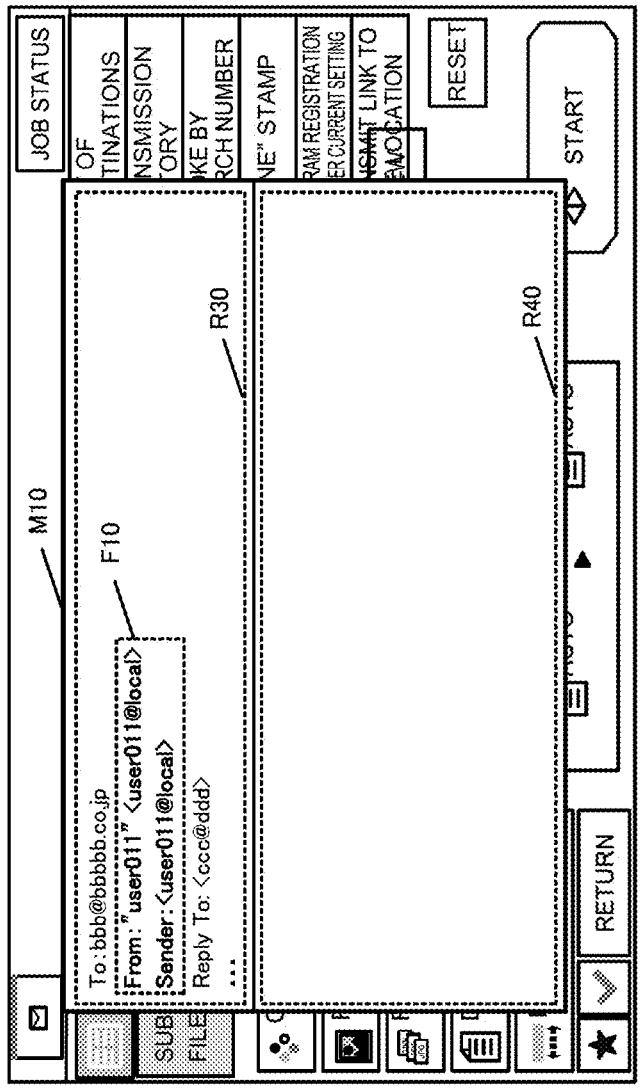
FIG. 9 is a diagram for explaining an operation example of the first embodiment.

FIG. 9 is a diagram for explaining an exemplary configuration of an e-mail screen M10 when the one or more controllers 11 have determined that the transmission source address is the user information of the logged-in user. The e-mail screen M10 includes header area R30 and a body area R40 which is an area to display an e-mail body. The header area R30 includes a From/Sender field F10, in addition to a transmission destination and a subject of the e-mail, and whether there is an attached document (image data) to the e-mail. When having determined that the transmission source address is the user information of the logged-in user, the one or more controllers 11 display "user011" <user011@local>, which is the name of the logged-in user, in the From field (Sender field) of the From/Sender field F10, and the e-mail address <user011@local> of the logged-in user in the Sender field (transmitter field), respectively. Note that no editing or modification of the information related to the transmission source address displayed in the From/Sender field F10 is preferably not allowed.

Figure 10:
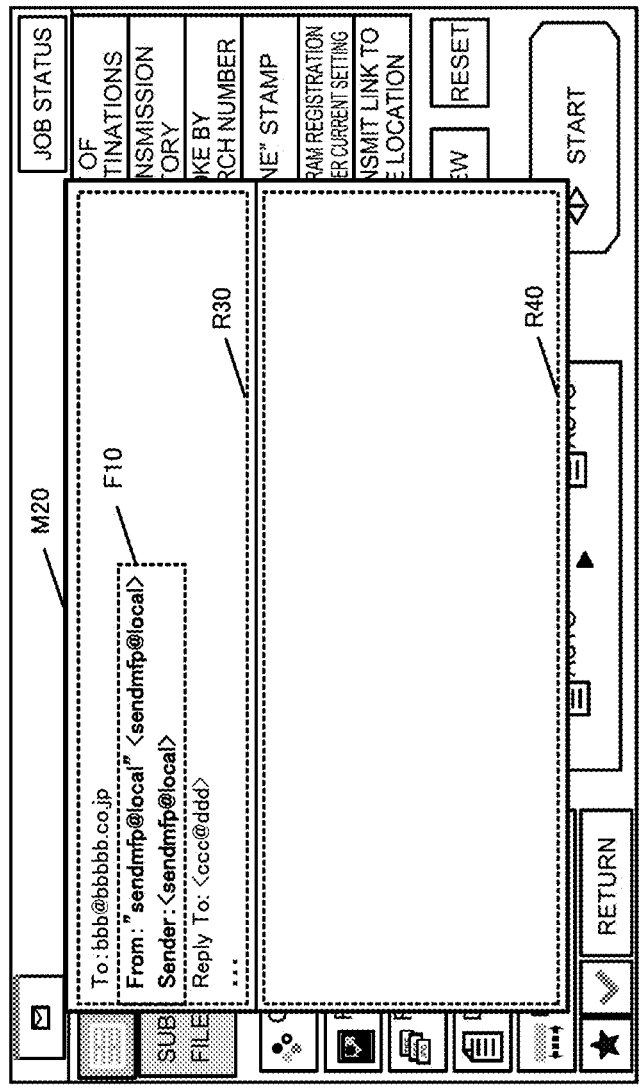
FIG. 10 is a diagram for explaining an operation example of the first embodiment.

On the other hand, FIG. 10 is a diagram for explaining an exemplary configuration of an e-mail screen M20 when the one or more controllers 11 have determined that the transmission source address is the transmitter information set for the apparatus. When having determined that the transmission source address is the transmitter information set for the apparatus, the one or more controllers 11 display "sendmfp@local" <sendmfp@local> which is based on SMTP setting, in the From field of the From/Sender field F10, and <sendmfp@local> in the Sender field, respectively.

As stated so far, according to the first embodiment, when the priority setting of the transmission source address is enabled, the transmission source address is set based on the user information of the logged-in user, whereas when the priority setting of the transmission source address is disabled, the transmission source address is set based on the transmitter information set for the apparatus. Consequently, the logged-in user of the compound machine 10 can easily set his or her e-mail address to the transmission source address as necessary. On the other hand, for example when, for security purpose or the like, it is not desirable to set the e-mail address of the logged-in user himself or herself to the transmission source address, the transmitter information which is set to the compound machine 10 (SMTP setting), can be set as the transmission source address. Therefore, according to the first embodiment, flexible operation is possible regarding setting of the From/Sender field of e-mail, particularly in terms of display in the From/Sender field.

2. Second Embodiment

In the first embodiment, a name or an e-mail address of a logged-in user is set to the From/Sender field as the transmission source address. A second embodiment is explained below, in which group information related to a group to which the logged-in user belongs, can also be set to the From/Sender field, in addition to the name or the e-mail address of the logged-in user.

The function configuration and the flow of processes of the compound machine 10 according to the second embodiment can be the same as their counterparts of the first embodiment, and therefore the description thereof is omitted here.

Figure 11:
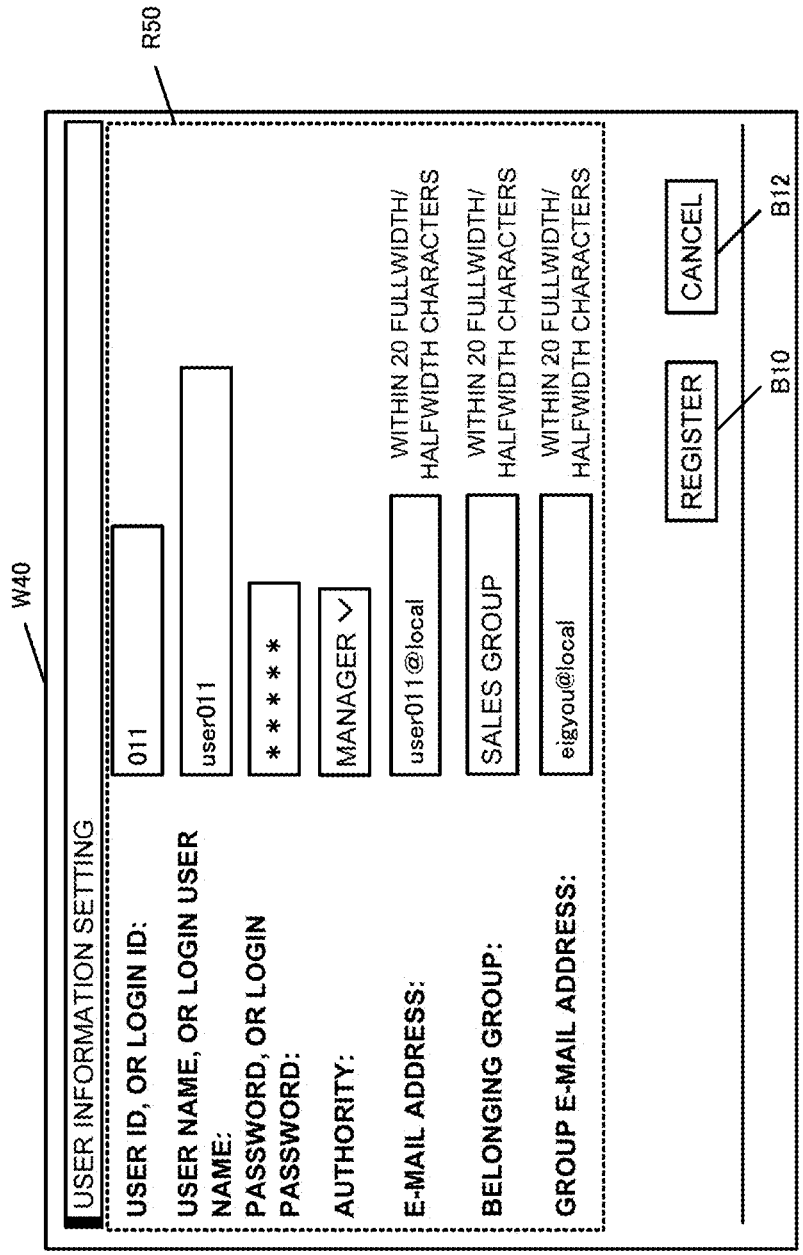
FIG. 11 is a diagram for explaining a second embodiment.

FIG. 11 is a diagram for explaining an exemplary configuration of a user information setting screen W40 according to the second embodiment.

The user information setting screen W40 includes a user information inputting area R50, a registration button B10, and a cancellation button B12.

The user information inputting area R50 includes, in addition to the configuration of the user information inputting area R10 exemplified by the user information setting screen W10 of the first embodiment, a belonging group input box and a group e-mail address input box.

The belonging group input box is an input box to accept an input of a name of a belonging group to which the logged-in user belongs. The group e-mail address input box is an input box to accept an input of a shared or representative e-mail address of the belonging group.

FIG. 11 is an example in which "sales group" is input as a belonging group to which the logged-in user belongs, and "eigyou@local" is input as an e-mail address.

The registration button B10 and the cancellation button B12 can have the same configurations as the registration button B10 and the cancellation button B12 described in the first embodiment, respectively, and therefore the description thereof is omitted here.

FIG. 12 is for explaining an exemplary configuration of a data structure of a user information table according to the second embodiment. The user information table according to the second embodiment includes a belonging group and a group e-mail address, in addition to the items to be managed, which are illustrated in the user information table of FIG. 3.

The belonging group and the group e-mail address represents a belonging group and a group e-mail address, for which inputting is accepted in the user information inputting area R50 of the user information setting screen W40, and indicates that "sales group" is registered as the belonging group to which the logged-in user "user011" belongs, and "eigyou@local" is registered as the group e-mail address.

Figure 13:
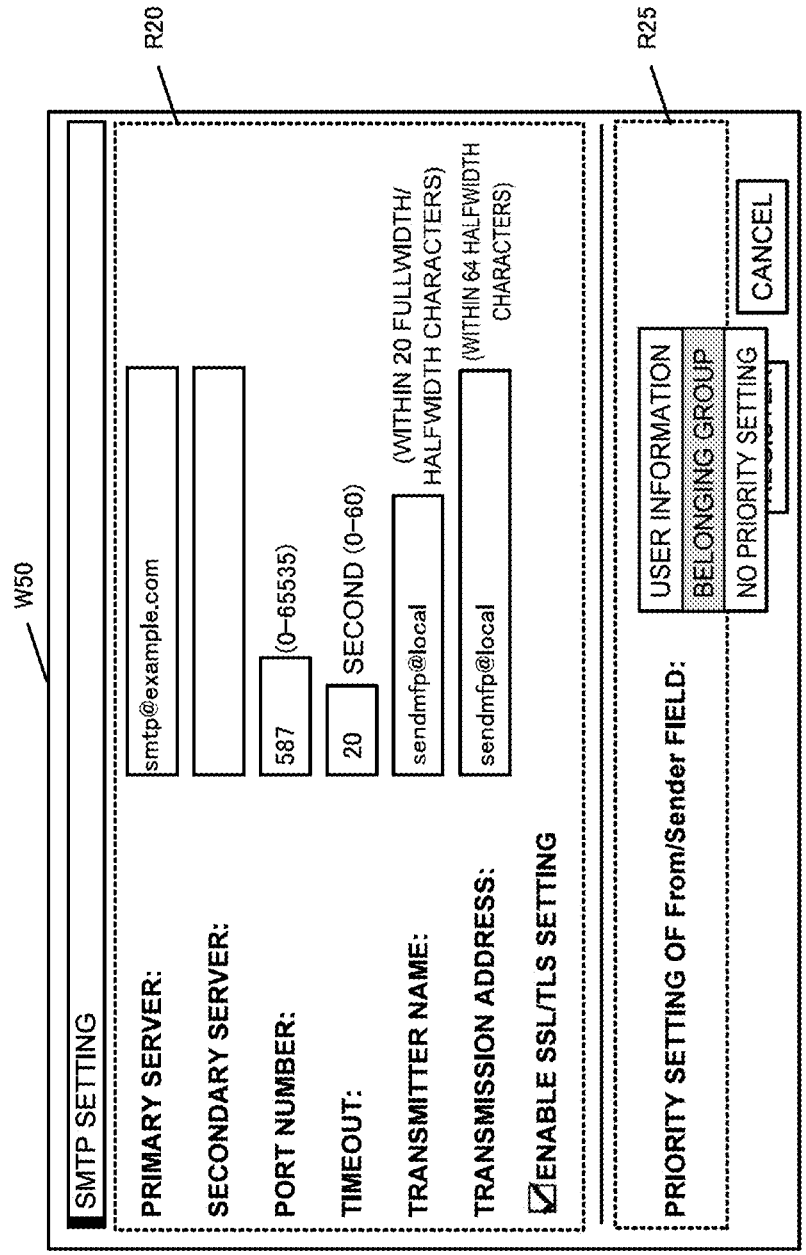
FIG. 13 is a diagram for explaining the second embodiment.

FIG. 13 is a diagram for explaining an exemplary configuration of an SMTP setting screen W50 according to the second embodiment.

The SMTP setting screen W50 includes a transmission source address priority setting area R25, in place of the transmission source address priority setting area R22 in the SMTP setting screen W20 according to the first embodiment.

The transmission source address priority setting area R25 includes a pull-down menu to accept selection of the transmission source address to be displayed on the From/Sender field of the e-mail, from among the logged-in user's "user information", "belonging group", and "no priority setting". FIG. 13 is an example of a case in which "belonging group" is selected as the transmission source address by a user. According to the selection of the pull-down menu by the manager, the one or more controllers 11 set the transmission source address to be displayed on the From/Sender field of the e-mail, and register the setting content to the table indicating the setting status of the priority setting as illustrated in FIG. 4B.

Figure 14:
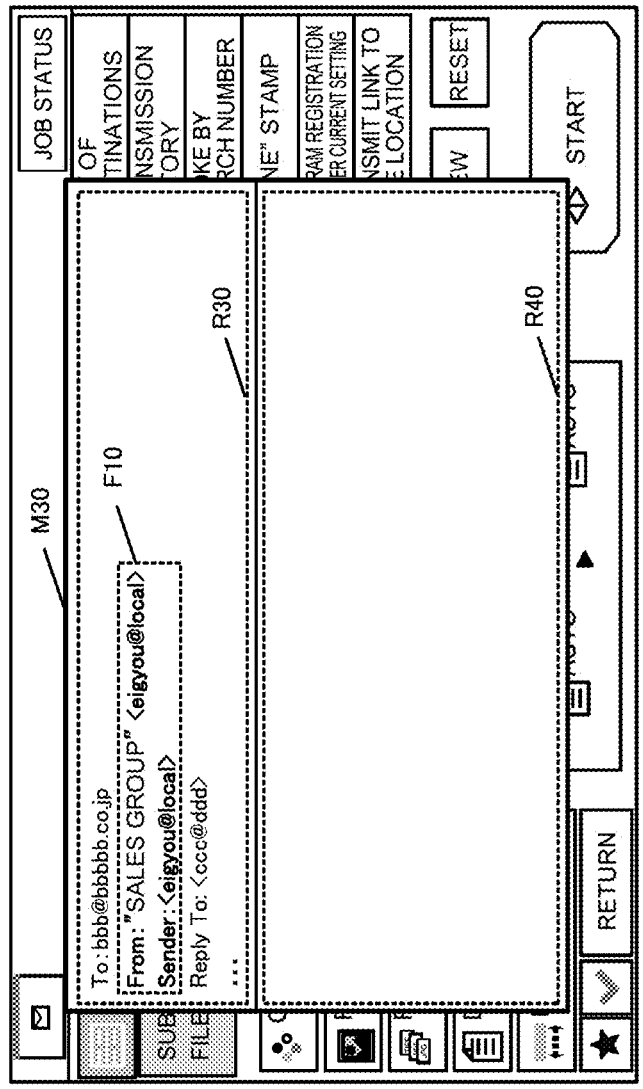
FIG. 14 is a diagram for explaining the second embodiment.

FIG. 14 is a diagram for explaining an exemplary configuration of an e-mail screen M30 when the one or more controllers 11 have determined that the transmission source address is the belonging group to which the logged-in user belongs. The e-mail screen M30 includes header area R30 and a body area R40 which is an area to display an e-mail body. The header area R30 includes a From/Sender field F10, in addition to a transmission destination and a subject of the e-mail, and whether there is an attached document (image data) to the e-mail. When having determined that the transmission source address is the belonging group to which the logged-in user belongs, the one or more controllers 11 display "sales group"<eigyou@local>in the From field of the From/Sender field F10, and the group e-mail address <eigyou@local>in the Sender field, respectively.

As stated so far, according to the second embodiment, information related to the group to which the logged-in user belongs can be set to the From/Sender field, as the user information. By adopting this configuration, the logged-in user can transmit e-mail in which the group e-mail address of the belonging group, to which he or she belongs, is set as the transmission source address, without using his or her e-mail address. Note that in the second embodiment, a belonging group, to which a logged-in user belongs, is explained as an aspect of the group information. However, not limited to this, the group information may include a company name, a business office, an official title, a job category, a team name, a project name, and an annotation assigned to the logged-in user, for example.

3. Third Embodiment

The first embodiment and the second embodiment determine whether to set the user information of the logged-in user or the transmitter information set for the apparatus, to the transmission source address to be set to the From/Sender field of e-mail, according to the priority setting of the transmission source address. The third embodiment is an embodiment where, in addition to the above-described configuration, the e-mail address of the transmitter information set for the apparatus is set to the From/Sender field as the transmission source address, when the e-mail address of the logged-in user is not registered (stored) as the user information.

The function configuration of the compound machine 10 according to the third embodiment can be the same as its counterparts of the first embodiment and the second embodiment, and therefore the description thereof is omitted here.

Figure 15:
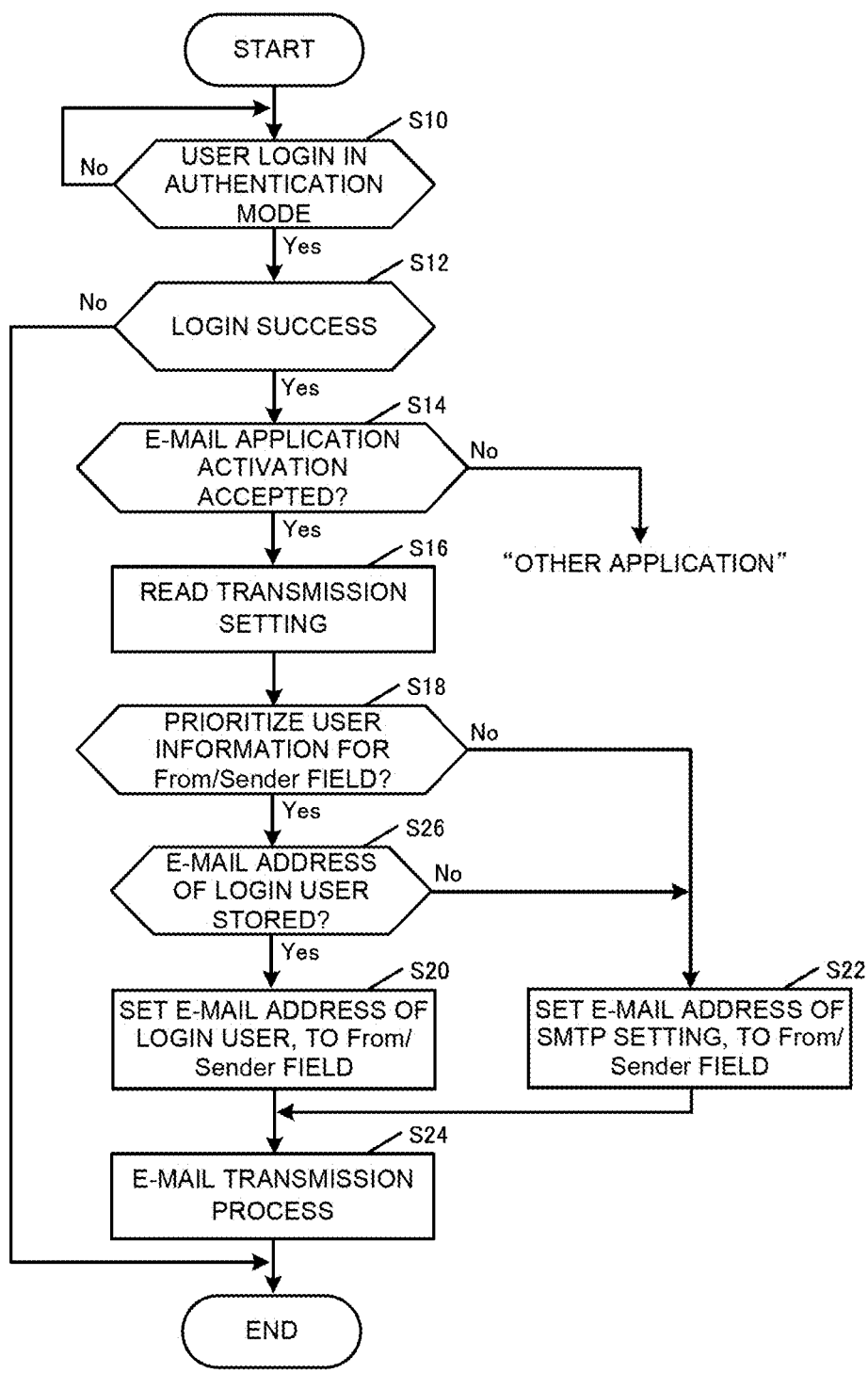
FIG. 15 is a flowchart for explaining a flow of processes of a third embodiment.

FIG. 15 is a flowchart for explaining a flow of processes to set the From/Sender field of e-mail in the compound machine 10 according to the third embodiment. Note that in the flow of processes according to the third embodiment, step S26 is newly provided between step S18 and step S20 which are described in the flowchart of FIG. 5. Therefore, the processing according to step S26 is described, whereas the description of the processing of any other step is omitted.

In step S18, when having determined that the priority setting of the user information is made for the From/Sender field, the one or more controllers 11 determine whether the e-mail address of the logged-in user is registered as the user information (step S18; Yes→step S26).

When having determined that the e-mail address of the logged-in user is registered as the user information, the one or more controllers 11 set the e-mail address of the logged-in user to the From/Sender field as the transmission source address (step S26; Yes→step S20). On the contrary, when having determined that the e-mail address of the logged-in user is not registered as the user information, the one or more controllers 11 set the e-mail address based on the SMTP setting in the From/Sender field as the transmission source address (step S26; No→step S22).

The one or more controllers 11 according to the third embodiment can set the e-mail address based on the SMTP setting in the From/Sender field as the transmission source address when, despite that the priority setting of the user information is made for the From/Sender field, it is nevertheless determined that the e-mail address of the logged-in user is not registered as the user information. Therefore, when the e-mail address of the logged-in user is not registered, as exemplified by the case of the user "user033" identified by the user ID "033" in the user information table in the example of FIG. 3, the one or more controllers 11 can nevertheless stably perform e-mail transmission, without causing any transmission error, by setting the e-mail address (sendermfp@local) in the SMTP setting, in the From/Sender field as the transmission source address.

4. Modification Example

The present disclosure is not limited to the above-described embodiments, and various changes are available. Specifically, embodiments to be obtained by appropriately combining modified technical means within a range that does not depart from the gist of the present disclosure are also included in the technical scope of the present disclosure.

Although some of the above-mentioned embodiments are described separately for convenience of explanation, it is of course possible to combine the embodiments within a technically feasible range.

In addition, a program operating in each device in the embodiments is a program (a program causing a computer to function) that controls a CPU, or the like, in such a way as to achieve functions of the above-described embodiments. Further, information to be handled by these devices is temporarily stored in a temporary storage device (e.g., a RAM) at a time of processing, and thereafter, is stored in a storage device such as various read only memories (ROMs), and HDDs, and is read and corrected or written by the CPU as necessary.

Herein, a recording medium for storing the program may be any of a semiconductor medium (e.g., a ROM, a non-volatile memory card, and the like), an optical recording medium or a magneto-optical recording medium (e.g., a digital versatile disc (DVD), a magneto optical disc (MO), a mini disc (MD), a compact disc (CD), a Blu-ray (registered trademark) disc (BD), and the like), a magnetic recording medium (e.g., a magnetic tape, a flexible disk, and the like), and the like. In addition, not only functions of the above-described embodiments are achieved by executing a loaded program, but also functions of the present disclosure may be achieved by processing the program jointly with an operating system, other application program(s), or the like, based on an instruction of the program.

Further, in a case of distributing the program in the market, the program can be stored in a portable recording medium and distributed, or can be transferred to a server computer connected via a network such as the Internet. In this case, it is needless to say that a storage device of the server computer is also included in the present disclosure.

The functional blocks or the various features of the apparatus used in the above-described embodiment can also be implemented or executed by an electric circuit, such as an integrated circuit or a plurality of integrated circuits. The electric circuit designed to realize the functions described in the present specification may include a general-purpose processor, a digital signal processor (DSP), an application specific integrated circuit (ASIC), a field programmable gate array (FPGA), or any other programmable logic device, a discrete gate or transistor logic, a discrete hardware component, or any combination thereof. The general-purpose processor may be a microprocessor, a conventional processor, a controller, a microcontroller, or a state machine. The above-described electric circuit may be configured by a digital circuit or an analogue circuit. When advancements in semiconductor technology lead to the emergence of integrated circuit technologies that could replace the current integrated circuits, one or more of the aspects of the present disclosure may be realized using such new integrated circuit.

While there have been described what are at present considered to be certain embodiments of the invention, it will be understood that various modifications may be made thereto, and it is intended that the appended claim cover all such modifications as fall within the true spirit and scope of the invention.

What is claimed is:

1. An image processing apparatus comprising:
one or more controllers that control a transmission of an electronic mail;
a storage that stores user information of one or more users; and
an authenticator that authenticates a logging in of a user among the one or more users, wherein
when a priority setting of a transmission source address is enabled, the one or more controllers set the transmission source address based on the user information of the user who has logged in,
when the priority setting of the transmission source address is disabled, the one or more controllers set the transmission source address based on transmitter information set for the image processing apparatus, and
when setting the user information as the transmission source address, the one or more controllers set a name of a logged-in user to a Sender field, and set an e-mail address of the logged-in user to a transmitter field.

2. The image processing apparatus according to claim 1, wherein the one or more controllers restrict editing of the user information of the logged-in user, which is set to the Sender field and the transmitter field.

3. The image processing apparatus according to claim 1, wherein when the storage does not store one or more e-mail addresses of the logged-in user as the user information of the logged-in user, the one or more controllers set the transmission source address based on the transmitter information set for the image processing apparatus.

4. The image processing apparatus according to claim 1, wherein when the priority setting of the transmission source address is disabled, the one or more controllers accept a selection, as to which of the user information of the logged-in user or the transmitter information set for the image processing apparatus is to be set, as the transmission source address.

5. The image processing apparatus according to claim 1, wherein the user information includes group information related to a group to which the logged-in user belongs, and when the priority setting of the transmission source address is enabled, the one or more controllers set the group information to the Sender field and the transmitter field.

6. A setting method of an electronic mail, the setting method comprising:

storing user information of one or more users;

authenticating a logging in of a user among the one or more users;

when a priority setting of a transmission source address is enabled, setting the transmission source address based on the user information of the user who has logged in;

when the priority setting of the transmission source address is disabled, setting the transmission source address based on transmitter information set for an image processing apparatus; and when setting the user information as the transmission source address, setting a name of a logged-in user to a Sender field, and setting an e-mail address of the logged-in user to a transmitter field.

* * * * *